(12) United States Patent
Wei

(10) Patent No.: US 12,255,739 B2
(45) Date of Patent: Mar. 18, 2025

(54) DATA TRANSMISSION APPARATUS AND METHOD OF CROSS-DOMAIN DATA TRANSMISSION

(71) Applicant: Realtek Semiconductor Corporation, Hsinchu (TW)

(72) Inventor: Wei-Yi Wei, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 45 days.

(21) Appl. No.: 18/487,116

(22) Filed: Oct. 15, 2023

(65) Prior Publication Data
US 2024/0171309 A1  May 23, 2024

(30) Foreign Application Priority Data
Nov. 21, 2022 (TW) ................................. 111144470

(51) Int. Cl.
*H04L 1/00* (2006.01)
*G06F 5/06* (2006.01)
*G06F 11/00* (2006.01)

(52) U.S. Cl.
CPC .............. *H04L 1/0061* (2013.01); *G06F 5/06* (2013.01); *G06F 11/00* (2013.01); *H04L 1/0045* (2013.01)

(58) Field of Classification Search
CPC ....... H04L 1/0061; H04L 1/0045; G06F 5/06; G06F 11/00
USPC .......................... 714/800, 768, 802, 819, 821
See application file for complete search history.

(56) References Cited

U.S. PATENT DOCUMENTS

| | | | |
|---|---|---|---|
| 6,385,720 B1* | 5/2002 | Tanaka | G06F 9/3844 712/213 |
| 6,696,854 B2* | 2/2004 | Momtaz | G06F 5/10 365/221 |
| 8,270,552 B1* | 9/2012 | Oner | H04L 7/02 375/372 |
| 2016/0226655 A1* | 8/2016 | Mu | G06F 5/06 |
| 2016/0328182 A1* | 11/2016 | Goikhman | G06F 3/0688 |
| 2020/0097038 A1* | 3/2020 | Kinnerk | G06F 1/14 |
| 2020/0409408 A1* | 12/2020 | Nair | G06F 1/12 |
| 2024/0171309 A1* | 5/2024 | Wei | G06F 5/06 |

FOREIGN PATENT DOCUMENTS

| | | |
|---|---|---|
| TW | 201435603 A | 9/2014 |
| TW | 201439714 A | 10/2014 |
| TW | 201642275 A | 12/2016 |

* cited by examiner

*Primary Examiner* — John J Tabone, Jr.
(74) *Attorney, Agent, or Firm* — CKC & Partners Co., LLC

(57) ABSTRACT

A data transmission apparatus includes a transmit-side circuit and a receive-side circuit. The transmit-side circuit belongs to a first clock domain, and is configured to store a plurality of input data. The receive-side circuit belongs to a second clock domain, and is configured to read a plurality of output data from the transmit-side circuit. The transmit-side circuit is configured to calculate a transmit-side parity value according to the plurality of input data. The receive-side circuit is configured to calculate a receive-side parity value according to the plurality of output data. The receive-side circuit is configured to compare the transmit-side parity value with the receive-side parity value to generate a control signal. The transmit-side circuit and the receive-side circuit are configured to reset, according to the control signal, a write pointer of the transmit-side circuit and a read pointer of the receive-side circuit.

20 Claims, 4 Drawing Sheets

DATA TRANSMISSION APPARATUS AND METHOD OF CROSS-DOMAIN DATA TRANSMISSION

RELATED APPLICATIONS

This application claims priority to Taiwan Application Serial Number 111144470, filed on Nov. 21, 2022, which is herein incorporated by reference in its entirety.

BACKGROUND

Technical Field

The present disclosure relates to a technique of cross-domain data transmission. More particularly, the present disclosure relates to a data transmission apparatus and a method of cross-domain data transmission capable of detecting and calibrating operation errors.

Description of Related Art

Modules in advanced chips can operate in multiple different clock domains. Therefore, it is inevitable that data needs to be transmitted between different clock domains. The industries usually use a synchronizer and a non-synchronous FIFO memory to perform the cross-domain data transmission. However, the synchronizer is only applicable to transmitting 1-bit data. When transmitting multi-bit data, the synchronizer is prone to obtaining erroneous values due to metastability. Further, although the non-synchronous FIFO memory is applicable to transmitting the multi-bit data, when encountering an electrostatic discharging event, an excessive high voltage or an excessive high environmental temperature, the data stored in the non-synchronous FIFO memory, a read pointer and a write pointer may change to erroneous values. The non-synchronous FIFO memory is lack of the ability to restore correct values.

SUMMARY

The disclosure provides a data transmission apparatus including a transmit-side circuit and a receive-side circuit. The transmit-side circuit belongs to a first clock domain, and is configured to store a plurality of input data. The receive-side circuit belongs to a second clock domain, and is configured to read a plurality of output data from the transmit-side circuit. The transmit-side circuit is configured to calculate a transmit-side parity value according to the plurality of input data. The receive-side circuit is configured to calculate a receive-side parity value according to the plurality of output data. The receive-side circuit is configured to compare the transmit-side parity value with the receive-side parity value to generate a control signal. The transmit-side circuit and the receive-side circuit are configured to reset, according to the control signal, a write pointer of the transmit-side circuit and a read pointer of the receive-side circuit.

The disclosure provides a method of cross-domain data transmission which is applicable to a data transmission apparatus. The data transmission apparatus includes a transmit-side circuit and a receive-side circuit. The transmit-side circuit and the receive-side circuit belong to the first clock domain and the second clock domain, respectively. The method includes the following operations: storing a plurality of input data in the transmit-side circuit; reading, by the receive-side circuit, a plurality of output data from the transmit-side circuit; calculating, by the transmit-side circuit, a transmit-side parity value according to the plurality of input data; calculating, by the receive-side circuit, a receive-side parity value according to the plurality of output data; comparing, by the receive-side circuit, the transmit-side parity value with the receive-side parity value to generate a control signal; and resetting, according to the control signal, a write pointer of the transmit-side circuit and a read pointer of the receive-side circuit.

It is to be understood that both the foregoing general description and the following detailed description are by examples, and are intended to provide further explanation of the disclosure as claimed.

DETAILED DESCRIPTION

Figure 1:
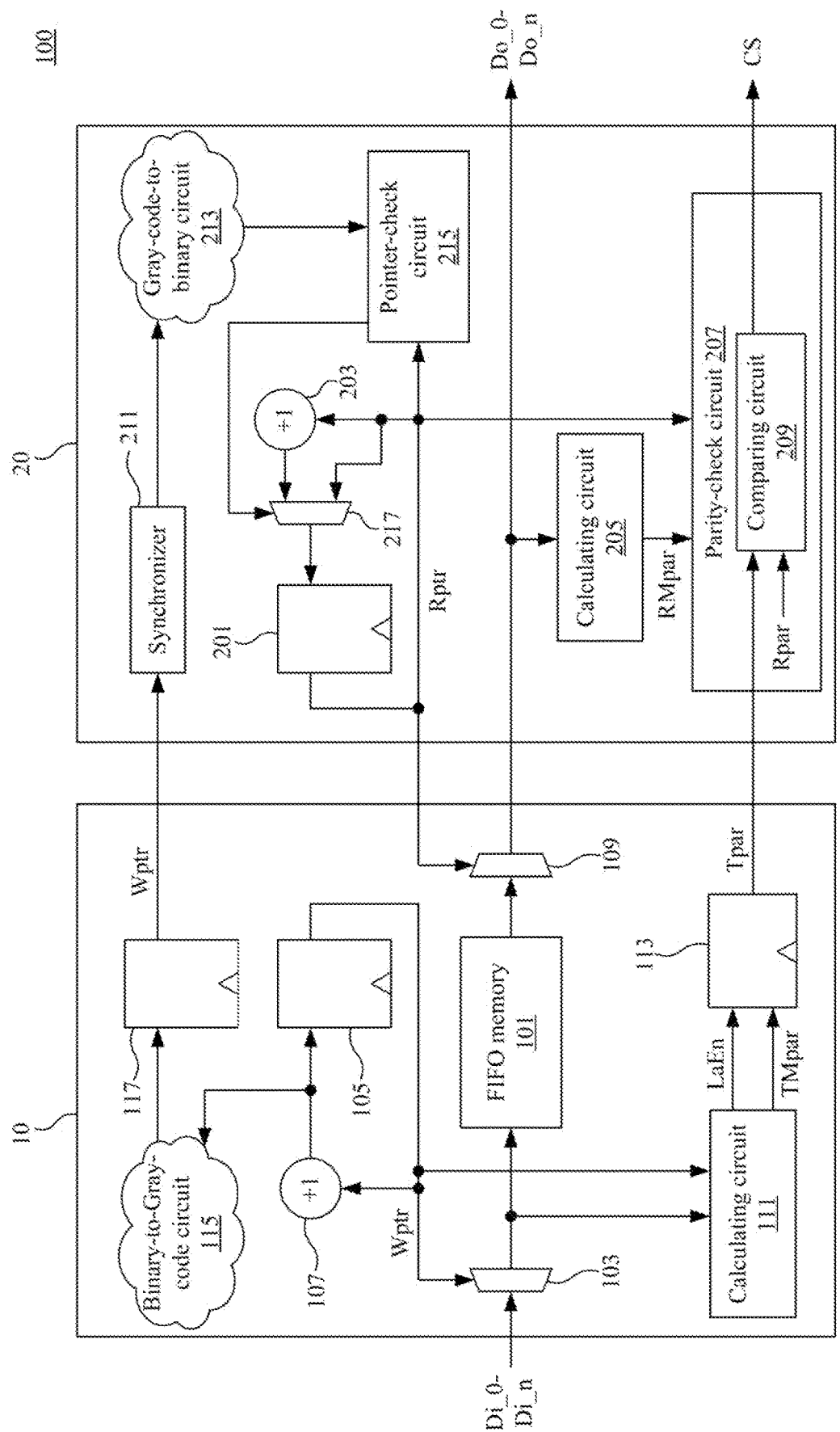
FIG. 1 is a simplified functional block diagram of a data transmission apparatus according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a simplified functional block diagram of a data transmission apparatus 100 according to one embodiment of the present disclosure. The data transmission apparatus 100 comprises a transmit-side circuit 10 and a receive-side circuit 20. The transmit-side circuit 10 and the receive-side circuit 20 belong to a first clock domain DA and a second clock domain DB, respectively. A clock of the first clock domain DA and a clock of the second clock domain DB have different phases and/or different frequencies. The data transmission apparatus 100 is configured to receive data signals (i.e., input data $Di\_0$-$Di\_n$ of FIG. 1), and configured to transmit the data signals from the first clock domain DA to the second clock domain DB to generate outputs (i.e., output data $Do\_0$-$Do\_n$ of FIG. 1). In some embodiments, the data transmission apparatus 100 may be implemented in a chip.

Figure 2:
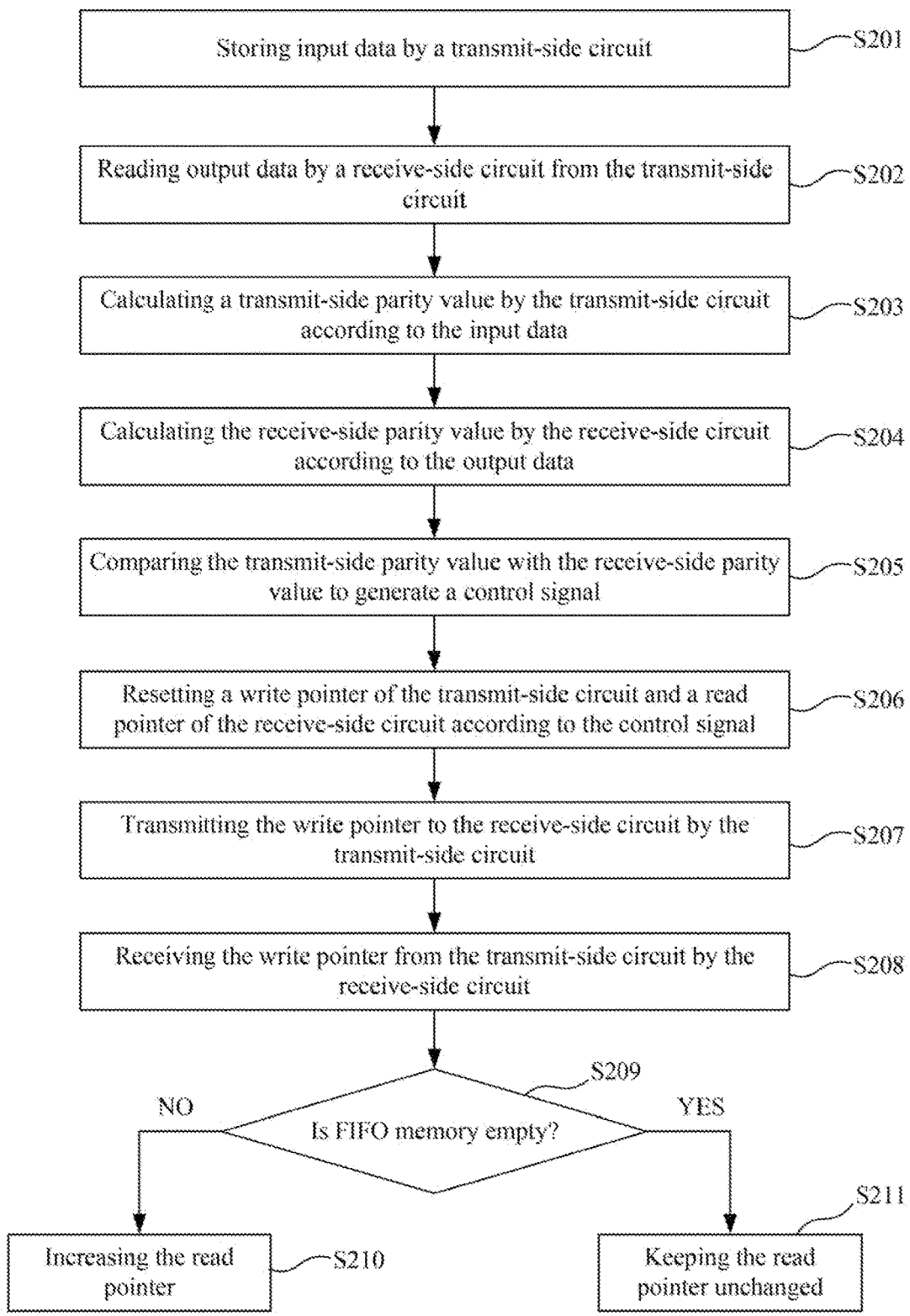
FIG. 2 is a flowchart of a method of cross-domain data transmission according to one embodiment of the present disclosure.

Operations of the data transmission apparatus 100 will be discussed with reference to FIGS. 1 and 2, in which FIG. 2 is a flowchart of a method 200 of cross-domain data transmission according to one embodiment of the present disclosure.

In step S201, the transmit-side circuit 10 stores the input data $Di\_0$-$Di\_n$. In specific, the transmit-side circuit 10 comprises a first-in first-out (FIFO) memory 101 and a demultiplexer 103. The demultiplexer 103 receives a write pointer Wptr of the transmit-side circuit 10 and the input data $Di\_0$-$Di\_n$, and sequentially writes the input data $Di\_0$-$Di\_n$ to a bottom of the FIFO memory 101 according to the write pointer Wptr. The transmit-side circuit 10 further comprises a register 105 and an adder 107. The register 105 is configured to generate the write pointer Wptr. The adder 107 is configured to receive the write pointer Wptr, and feed the write pointer Wptr back to the register 105 after adding a value of the write pointer Wptr by 1, so as to sequentially increase the value of the write pointer Wptr.

In step S202, the receive-side circuit 20 reads the output data Do_0-Do_n from the transmit-side circuit 10. In specific, the receive-side circuit 20 transmits a read pointer Rptr to a multiplexer 109 of the transmit-side circuit 10, so that the multiplexer 109 sequentially output data at a top of the FIFO memory 101 as the output data Do_0-Do_n. As such, the receive-side circuit 20 is capable of reading the output data Do_0-Do_n. The receive-side circuit 20 further comprises a register 201 and an adder 203. The register 201 is configured to generate the read pointer Rptr. The adder 203 is configured to receive the read pointer Rptr and feed the read pointer Rptr back to the register 201 after adding a value of the read pointer Rptr by 1, so as to sequentially increase the value of the read pointer Rptr.

Figure 3:
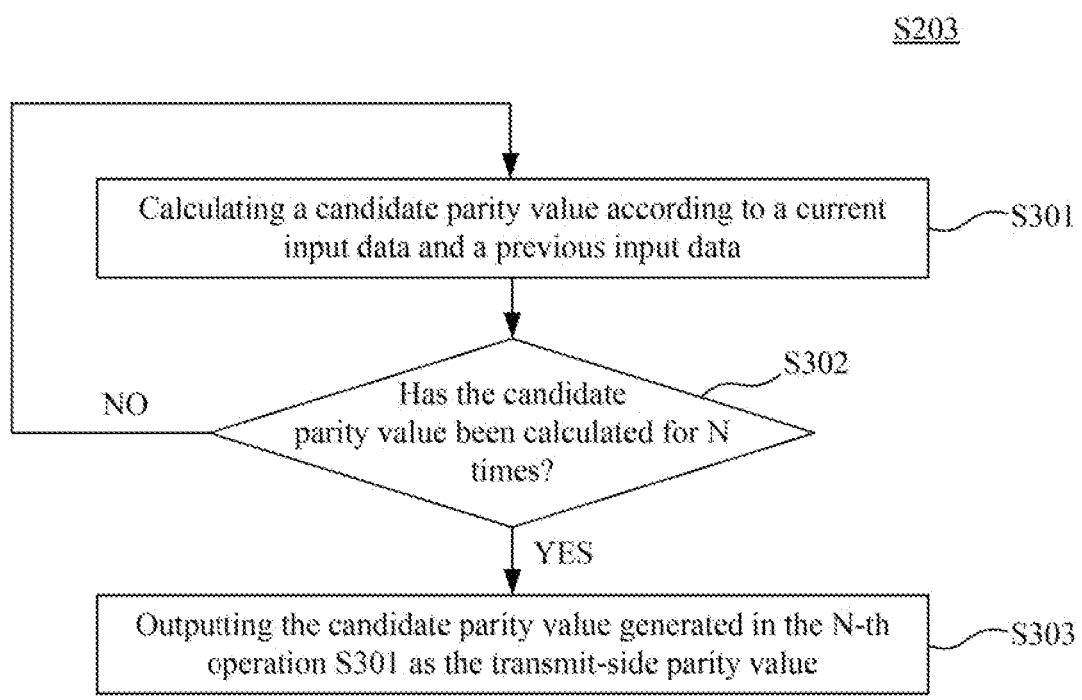
FIG. 3 is a detailed flowchart of operation S203 of FIG. 2 according to one embodiment of the present disclosure.

In step S203, the transmit-side circuit 10 calculates a transmit-side parity value Tpar according to the input data Di_0-Di_n. Reference is also made to FIG. 3, in which FIG. 3 is a detailed flowchart of step S203 of FIG. 2 according to one embodiment of the present disclosure. Step S203 comprises steps S301-S303.

In step S301, a calculating circuit 111 of the transmit-side circuit 10 receives the input data Di_0-Di_n from output terminals of the demultiplexer 103, so as to calculate a candidate parity value TMpar according to the input data currently written into the FIFO memory 101 (e.g., the input data Di_1, hereinafter referred to as "current input data") and the input data previously written into the FIFO memory 101 (e.g., the input data Di_0, hereinafter referred to as "previous input data"). In some embodiments, the calculating circuit 111 performs an XOR operation on the current input data and the previous input data to generate the candidate parity value TMpar. In some embodiments, the calculating circuit 111 may also generate the candidate parity value TMpar by means of cyclic redundancy check (CRC), checksum or the like.

In step S302, the calculating circuit 111 receives the write pointer Wptr from the register 105. The calculating circuit 111 determines whether the candidate parity value TMpar has been calculated for N times (i.e., whether the storing operation of step S301 has been repeated for N times), according to the write pointer Wptr, wherein N is a positive integer. If not, the data transmission apparatus 100 may repeat step S301. If so, the data transmission apparatus 100 performs step S303, so that the calculating circuit 111 uses a latch-enable signal LaEn to control a register 113 of the transmit-side circuit 10 to store the candidate parity value TMpar. The register 113 is configured to output the stored candidate parity value TMpar as the transmit-side parity value Tpar. That is, the candidate parity value TMpar generated in the N-th step S301 is outputted as the transmit-side parity value Tpar. On the other hand, the register 113 does not store the candidate parity values TMpar generated in the first to (N−1)-th steps S301.

On the other words, each time when the demultiplexer 103 writes one of the input data Di_0-Di_n into the FIFO memory 101, the candidate parity value TMpar changes correspondingly. Each time when the transmit-side circuit 10 performs N times of storage (i.e., writing) operation, the calculating circuit 111 (periodically) sets the transmit-side parity value Tpar to the current candidate parity value TMpar.

In some embodiments, the FIFO memory 101 comprises N entries.

In some embodiments, the calculating circuit 111 may be implemented using single-chip processor(s), multi-chip processor(s), application specific integrated circuit(s) (ASIC(s)), field-programmable gate arrays (FPGA(s)), other suitable logic circuit(s) or any combination thereof.

Figure 4:
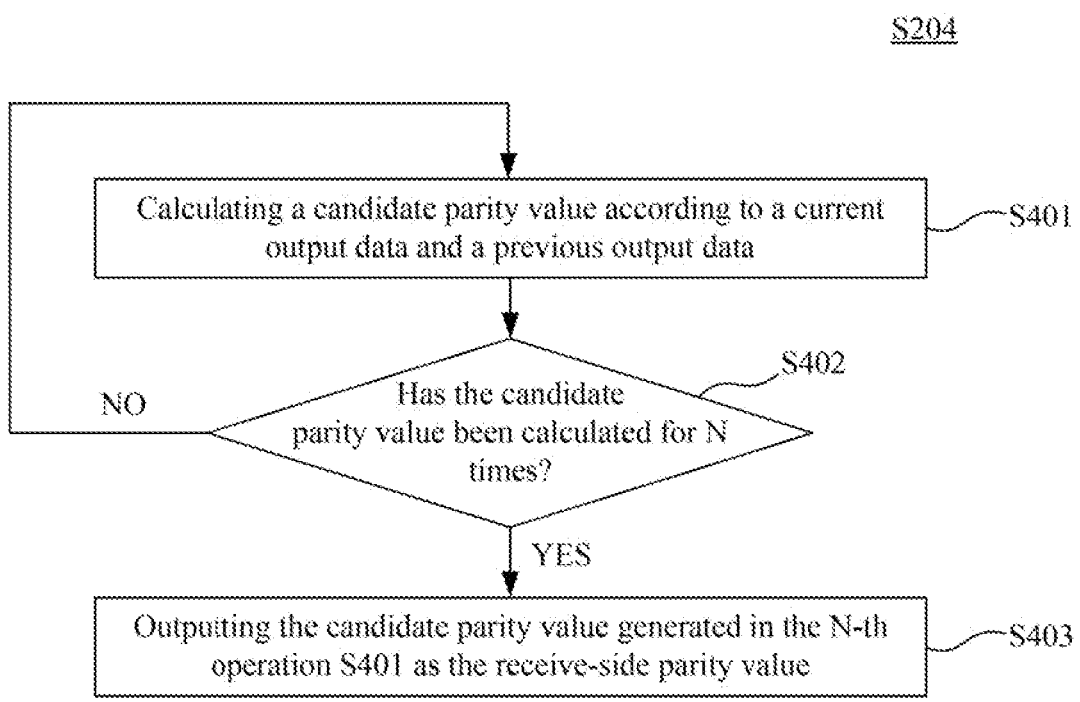
FIG. 4 is a detailed flowchart of operation S204 of FIG. 2 according to one embodiment of the present disclosure.

Reference is made again to FIG. 2, in step S204, the receive-side circuit 20 calculates a receive-side parity value Rpar according to the output data Do_0-Do_n. Steps S401-S403 included in step S204 are described in the following paragraphs with reference to FIG. 4, wherein FIG. 4 is a detailed flowchart of step S204 of FIG. 2 according to one embodiment of the present disclosure.

In step S401, a calculating circuit 205 of the receive-side circuit 20 receives the output data Do_0-Do_n from an output terminal of the multiplexer 109, so as to calculate a candidate parity value RMpar according to output data currently read out from the FIFO memory 101 (e.g., the output data Do_1, hereinafter referred to as "current output data") and output data previously read out from the FIFO memory 101 (e.g., the output data Do_0, hereinafter referred to as "previous output data"). In some embodiments, the calculating circuit 205 performs the XOR operation on the current output data and the previous output data to generate the candidate parity value RMpar. In some embodiments, the calculating circuit 205 may also generate the candidate parity value RMpar by means of CRC, checksum or the like.

In step S402, a parity-check circuit 207 of the receive-side circuit 20 receives the read pointer Rptr from the register 201, and determines whether the candidate parity value RMpar has been calculated for N times according to the read pointer Rptr (i.e., whether the reading operation of step S401 has been repeated for N times). If not, the data transmission apparatus 100 may repeat step S401. If so, the data transmission apparatus 100 performs step S403, so that the parity-check circuit 207 uses the current candidate parity value RMpar as the receive-side parity value Rpar, that is, using the candidate parity value RMpar generated in N-th step S401 as the receive-side parity value Rpar.

In some embodiments, the parity-check circuit 207 may be implemented using single-chip processor(s), multi-chip processor(s), application specific integrated circuit(s) (ASIC(s)), field-programmable gate array(s) (FPGA(s)), other suitable logic circuit(s) or any combination thereof.

Reference is again made to FIG. 2. In step S205, a comparing circuit 209 of the parity-check circuit 207 compares the transmit-side parity value Tpar with the receive-side parity value Rpar to generate a control signal CS. That is, the parity-check circuit 207 compares the candidate parity value RMpar generated in the N-th step S401 with the transmit-side parity value Tpar. A first logic value of the control signal CS (e.g., logic 0) represents that the transmit-side parity value Tpar is identical to the receive-side parity value Rpar. That is, it implies that the data in the FIFO memory 101, the write pointer Wptr and the read pointer Rptr are all correct. A second logic value of the control signal CS (e.g., logic 1) represents that the transmit-side parity value Tpar is different from the receive-side parity value Rpar, that is, at least one of the data in the FIFO memory 101, the write pointer Wptr and the read pointer Rptr are incorrect.

In step S206, the data transmission apparatus 100 resets the write pointer Wptr of the transmit-side circuit 10 and the read pointer Rptr of the receive-side circuit 20, according to the control signal CS. In specific, the register 105 of the transmit-side circuit 10 comprises a reset terminal, and the register 105 receives the control signal CS through the reset terminal thereof. As such, the register 105 may be reset by the control signal CS having the second logic value (e.g., logic 1), thereby resetting the write pointer Wptr to an initial value thereof. The register 201 of the receive-side circuit 20 comprises a reset terminal, and the register 201 receives the control signal CS through the reset terminal thereof. As such, the register 201 may be reset by the control signal CS having the second logic value (e.g., logic 1), thereby resetting the read pointer Rptr to an initial value thereof.

In some embodiments, the control signal CS needs not to be directly transmitted to the register 105 and the register 201, and is transmitted to a software module, a firmware module or a digital circuit with computing ability that is external to the data transmission apparatus 100. When the control signal CS has the second logic value (e.g., logic 1), the software module, the firmware module or the digital circuit may reset the register 105 and the register 201, and may further restore the data in the FIFO memory 101, for example, by re-writing a certain amount of data, transmitted before detection of malfunction, into the FIFO memory 101.

On the other hand, if the control signal CS has the first logic value (e.g., logic 0), the register 105 and the register 201 are not reset (i.e., the write pointer Wptr and the read pointer Rptr are not reset), and the data in the FIFO memory 101 are not restored.

In summary, when the data in the FIFO memory 101, the write pointer Wptr or the read pointer Rptr changes to an incorrect value because of specific events (e.g., an electrostatic discharge event, an excessive high voltage or an excessive high environmental temperature), the data transmission apparatus 100 can automatically find and calibrate such erroneous operation through different transmit-side parity value Tpar and the receive-side parity value Rpar.

The method 200 of cross-domain data transmission further includes steps S207-S211. In step S207, the transmit-side circuit 10 transmits the write pointer Wptr to the receive-side circuit 20. A binary-to-Gray-code circuit 115 of the transmit-side circuit 10 converts the write pointer Wptr into its Gray codes, and transmits the Gray-coded write pointer Wptr to a register 117 of the transmit-side circuit 10. The register 117 transmits the Gray-coded write pointer Wptr to the receive-side circuit 20.

In step S208, the receive-side circuit 20 receives the write pointer Wptr from the transmit-side circuit 10. A synchronizer 211 of the receive-side circuit 20 receives the Gray-coded write pointer Wptr, and provides the write pointer Wptr to a Gray-code-to-binary circuit 213 of the receive-side circuit 20. The Gray-code-to-binary circuit 213 converts the Gray-coded write pointer Wptr to its binary form.

In step S209, the receive-side circuit 20 determines whether the FIFO memory 101 is empty, according to the write pointer Wptr and the read pointer Rptr. In specific, a pointer-check circuit 215 of the receive-side circuit 20 receives the write pointer Wptr from the Gray-code-to-binary circuit 213, and also receives the read pointer Rptr from the register 201. The pointer-check circuit 215 compares the write pointer Wptr with the read pointer Rptr for checking whether they are identical.

If the determination of step S209 is "NO" (i.e., the write pointer Wptr is different from the read pointer Rptr, which represents that the FIFO memory 101 still holds data), the data transmission apparatus 100 performs step S210, so that the pointer-check circuit 215 controls a multiplexer 217 of the receive-side circuit 20 to provide an output of the adder 203 to the register 201. As a result, the read pointer Rptr increases to read out next data from the FIFO memory 101.

If the determination of operation S209 is "YES" (i.e., the write pointer Wptr is identical to the read pointer Rptr, which represents that the FIFO memory 101 is empty), the data transmission apparatus 100 performs step S211, so that the pointer-check circuit 215 controls the multiplexer 217 to feed the output of the register 201 directly back to the register 201. As a result, the read pointer Rptr is kept unchanged to temporarily stop reading the FIFO memory 101. After step S210 or step S211 is finished, the data transmission apparatus 100 may repeat step S207.

In some embodiments, the pointer-check circuit 215 may be implemented using single-chip processor(s), multi-chip processor(s), application specific integrated circuit(s) (ASIC(s)), field-programmable gate array(s) (FPGA(s)), other suitable logic circuit(s) or any combination thereof.

In summary, when the FIFO memory 101 is empty, the data transmission apparatus 100 automatically stops the reading operation to avoid generating erroneous output data.

The aforementioned method 200 of cross-domain data transmission or any of the other methods described in this disclosure may be embodied in instructions stored in a non-transitory computer readable storage medium. The instructions, when being executed by one or more processors, cause some or all of such methods to be performed. It can be understood that any of the methods discussed in this disclosure may include greater or fewer steps than illustrated in the flowchart and the steps may be performed in any order, as appropriate.

In one embodiment, for example, steps S201-S206 may be performed in parallel with steps S207-S211.

Certain terms are used in the specification and the claims to refer to specific components. However, those of ordinary skill in the art would understand that the same components may be referred to by different terms. The specification and claims do not use the differences in terms as a way to distinguish components, but the differences in functions of the components are used as a basis for distinguishing. Furthermore, it should be understood that the term "comprising" used in the specification and claims is open-ended, that is, including but not limited to. In addition, "coupling" herein includes any direct and indirect connection means. Therefore, if it is described that the first component is coupled to the second component, it means that the first component can be directly connected to the second component through electrical connection or signal connections including wireless transmission, optical transmission, and the like, or the first component is indirectly electrically or signally connected to the second component through other component(s) or connection means.

It will be understood that, in the description herein and throughout the claims that follow, the phrase "and/or" includes any and all combinations of one or more of the associated listed items. Unless the context clearly dictates otherwise, the singular terms used herein include plural referents.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A data transmission apparatus, comprising:
   a transmit-side circuit, belonging to a first clock domain, and configured to store a plurality of input data; and a receive-side circuit, belonging to a second clock domain, and configured to read a plurality of output data from the transmit-side circuit, wherein the transmit-side circuit is configured to calculate a transmit-side parity value according to the plurality of input data, and the receive-side circuit is configured to calculate a receive-side parity value according to the plurality of output data, wherein the receive-side circuit is configured to compare the transmit-side parity value with the receive-side parity value to generate a control signal, and the transmit-side circuit and the receive-side circuit are configured to reset, according to the control signal, a write pointer of the transmit-side circuit and a read pointer of the receive-side circuit.

2. The data transmission apparatus of claim 1, wherein the transmit-side circuit comprises:

a calculating circuit, configured to receive the plurality of input data, and configured to, in response to storing current input data of the plurality of input data by the transmit-side circuit, calculate a candidate parity value according to the current input data and previous input data of the plurality of input data; and a register, configured to receive the candidate parity value from the calculating circuit, wherein in response to storing N-th current input data by the transmit-side circuit, the calculating circuit controls the register to store the candidate parity value of the N-th current input data and to output the candidate parity value of the N-th current input data as the transmit-side parity value, wherein N is a positive integer.

3. The data transmission apparatus of claim 2, wherein the calculating circuit is configured to receive the write pointer of the transmit-side circuit, and is configured to calculate a number of times of storing performed by the transmit-side circuit according to the write pointer of the transmit-side circuit.

4. The data transmission apparatus of claim 2, wherein the plurality of input data is stored in a first-in first-out (FIFO) memory of the transmit-side circuit, and the FIFO memory comprises N entries.

5. The data transmission apparatus of claim 1, wherein the receive-side circuit comprises:

a calculating circuit, configured to receive the plurality of output data, and configured to, in response to reading a current output data of the plurality of output data by the receive-side circuit, calculate a candidate parity value according to the current output data and previous output data of the plurality of output data; and a parity-check circuit, wherein in response to reading N-th current output data by the receive-side circuit, the parity-check circuit is configured to use the candidate parity value of the N-th current output data as the receive-side parity value, and is configured to compare the transmit-side parity value with the receive-side parity value to generate the control signal, wherein N is a positive integer.

6. The data transmission apparatus of claim 5, wherein the parity-check circuit is configured to receive the read pointer of the receive-side circuit, and is configured to calculate a number of times of reading performed by the receive-side circuit according to the read pointer of the receive-side circuit.

7. The data transmission apparatus of claim 5, wherein the plurality of input data is stored in a FIFO memory of the transmit-side circuit, and the FIFO memory comprises N entries.

8. The data transmission apparatus of claim 1, wherein a register of the transmit-side circuit is configured to generate the write pointer, and the register of the transmit-side circuit is configured to receive the control signal and to reset the write pointer according to the control signal, wherein a register of the receive-side circuit is configured to generate the read pointer, and the register of the receive-side circuit is configured to receive the control signal and to reset the read pointer according to the control signal.

9. The data transmission apparatus of claim 1, wherein the transmit-side circuit is configured to transmit the write pointer to the receive-side circuit, and the receive-side circuit is configured to determine, according to the write pointer and the read pointer, whether to stop reading the plurality of output data.

10. The data transmission apparatus of claim 1, wherein a clock of the first clock domain and a clock of the second clock domain have different phases and/or different frequencies.

11. A method of cross-domain data transmission, applicable to a data transmission apparatus, wherein the data transmission apparatus comprises a transmit-side circuit and a receive-side circuit, and the transmit-side circuit and the receive-side circuit are respectively in a first clock domain and a second clock domain, the method comprising:

storing a plurality of input data in the transmit-side circuit;

reading, by the receive-side circuit, a plurality of output data from the transmit-side circuit;

calculating, by the transmit-side circuit, a transmit-side parity value according to the plurality of input data;

calculating, by the receive-side circuit, a receive-side parity value according to the plurality of output data;

comparing, by the receive-side circuit, the transmit-side parity value with the receive-side parity value to generate a control signal; and resetting, according to the control signal, a write pointer of the transmit-side circuit and a read pointer of the receive-side circuit.

12. The method of cross-domain data transmission of claim 11, wherein calculating, by the transmit-side circuit, the transmit-side parity value according to the plurality of input data comprises:

(a1) in response to storing current input data of the plurality of input data to the transmit-side circuit, calculating a candidate parity value according to the current input data and previous input data of the plurality of input data; and (a2) repeating step (a1) and outputting the candidate parity value generated in N-th step (a1) as the transmit-side parity value, wherein N is a positive integer.

13. The method of cross-domain data transmission of claim 12, wherein (a2) repeating step (a1) and outputting the candidate parity value generated in N-th step (a1) as the transmit-side parity value comprises:

calculating, according to the write pointer of the transmit-side circuit, a number of times of repeating step (a1).

14. The method of cross-domain data transmission of claim 12, wherein the plurality of input data is stored in a FIFO memory of the transmit-side circuit, and the FIFO memory comprises N entries.

15. The method of cross-domain data transmission of claim 11, wherein calculating, by the receive-side circuit, the receive-side parity value according to the plurality of output data comprises:
- (b1) in response to reading current output data of the plurality of output data by the receive-side circuit, calculating a candidate parity value according to the current output data and previous output data of the plurality of output data; and
- (b2) repeating step (b1) and using the candidate parity value generated in N-th step (b1) as the receive-side parity value, wherein N is a positive integer.

16. The method of cross-domain data transmission of claim 15, wherein (b2) repeating step (b1) and using the candidate parity value generated in N-th step (b1) as the receive-side parity value comprises:
calculating, according to the read pointer of the receive-side circuit, a number of times of repeating step (b1).

17. The method of cross-domain data transmission of claim 15, wherein the plurality of input data is stored in a FIFO memory of the transmit-side circuit, and the FIFO memory comprises N entries.

18. The method of cross-domain data transmission of claim 11, wherein resetting, according to the control signal, the write pointer of the transmit-side circuit and the read pointer of the receive-side circuit comprises:
- using the control signal to reset a register of the transmit-side circuit, wherein the register of the transmit-side circuit is configured to generate the write pointer; and
- using the control signal to reset a register of the receive-side circuit, wherein the register of the receive-side circuit is configured to generate the read pointer.

19. The method of cross-domain data transmission of claim 11, further comprising:
- transmitting, by the transmit-side circuit, the write pointer to the receive-side circuit; and
- determining, by the receive-side circuit, whether to stop reading the plurality of output data according to the write pointer and the read pointer.

20. The method of cross-domain data transmission of claim 11, wherein a clock of the first clock domain and a clock of the second clock domain have different phases and/or different frequencies.

* * * * *